United States Patent [19]

Wakamori et al.

[11] Patent Number: 5,313,710
[45] Date of Patent: May 24, 1994

[54] TOE ANGLE DETECTING APPARATUS

[75] Inventors: Takehisa Wakamori; Takao Shibayama, both of Sayama, Japan

[73] Assignee: Honda Giken Kogyo Kabushiki Kaisha, Tokyo, Japan

[21] Appl. No.: 722,194

[22] Filed: Jun. 27, 1991

[30] Foreign Application Priority Data

Jul. 4, 1990 [JP] Japan .................. 2-177153
Jul. 19, 1990 [JP] Japan .................. 2-192508

[51] Int. Cl.⁵ ............................ G01B 5/255
[52] U.S. Cl. .................. 33/203.12; 33/203.13
[58] Field of Search .............. 33/203.12–203.21

[56] References Cited

U.S. PATENT DOCUMENTS

| | | | |
|---|---|---|---|
| 3,181,248 | 5/1965 | Manlove | 33/203.12 |
| 3,546,782 | 12/1970 | Pereue et al. | |
| 3,643,337 | 2/1972 | Dick | 33/203.13 |
| 4,679,327 | 7/1987 | Fouchey et al. | 33/203.13 |
| 4,885,846 | 12/1989 | Németh et al. | 33/203.13 |
| 4,901,560 | 2/1990 | Hirano et al. | |
| 5,111,585 | 5/1992 | Kawashima et al. | 33/203.12 |

FOREIGN PATENT DOCUMENTS

| | | |
|---|---|---|
| 457622 | 12/1936 | United Kingdom . |
| 1367603 | 9/1974 | United Kingdom . |
| 2153094 | 8/1985 | United Kingdom . |
| 2179165 | 2/1987 | United Kingdom . |
| 2179460 | 3/1987 | United Kingdom . |
| 2239099 | 6/1991 | United Kingdom . |

*Primary Examiner*—William A. Cuchlinski, Jr.
*Assistant Examiner*—C. W. Fulton

[57] ABSTRACT

A toe angle detecting apparatus includes a wheel supporting device for supporting thereon each wheel attached to a vehicle. The wheel supporting device is rotatably mounted on a vertical support shaft. A toe angle detecting device is rotatably mounted on the support shaft and provided with a pair of contact shoes spaced horizontally at a predetermined distance from each other. The toe angle detecting device is rotatable independently of the wheel supporting device. The contact shoes are displaceable vertically and displaceable radially with respect to the support shaft, and are brought into contact with the wheel at predetermined portions thereof to rotate the toe angle detecting device about the support shaft toward a toe direction of the wheel. An angle detector is provided for detecting an angle at which the toe angle detecting device is rotated about the support shaft.

12 Claims, 6 Drawing Sheets

TOE ANGLE DETECTING APPARATUS

BACKGROUND OF THE INVENTION

1. Field of the Invention

The present invention relates to a toe angle detecting apparatus capable of detecting the individual toe angles of each wheel attached to a vehicle.

2. Description of the Related Art

The accurate alignment of vehicle wheels is extremely important for the maintenance of running stability of a vehicle. Therefore, there have been proposed various devices used to measure or check respective states of alignment of the wheels.

As an apparatus for measuring toe angles of wheels, for example, there is known one in which a sensor is brought into contact with side portions of a tire of each wheel so as to detect angular displacements of the wheel with respect to the direction in which each wheel runs forward. However, vehicles as objects to be measured vary in size. Therefore, there are proposed wheel supporting means for supporting the wheels, which can be displaced in the directions of the length and width of a vehicle in order to meet the respective sizes.

However, there is a tendency for positional displacements of the sensor with respect to the wheel supporting means if the apparatus is constructed in this way. As a result, the sensor cannot be reliably brought into contact with each wheel supported by the wheel supporting means, thereby making it unable to detect the toe angle with high accuracy.

On the other hand, any tire varies in shape even when the sensor can be accurately brought into contact with the side portions of the wheel tire. Therefore, the value of the toe angle detected cannot be determined. Even when the tire is temporarily positionally adjusted using the value of the toe angle detected by the sensor, subsequent tire reproducibility is also poor. While the vehicle is running after completion of its adjustment, directional stability characteristics of the vehicle become poor or the angle of a spoke of a steering wheel becomes inappropriate.

SUMMARY OF THE INVENTION

It is a general object of the present invention to provide a toe angle detecting apparatus capable of detecting a toe angle with high accuracy to thereby adjust a toe angle which gives a vehicle the optimum setting for excellent running characteristics.

It is a principal object of the present invention to provide a toe angle detecting apparatus capable of detecting a toe angle with high accuracy even when a tire varies in shape.

It is another object of the present invention to provide a toe angle detecting apparatus of a type wherein after a toe angle is adjusted, subsequent tire reproducibility is excellent, and hence the directional stability characteristics of a vehicle under actual driving conditions can automatically be ensured after the adjustment of the toe angle is completed; the spoke angle of the steering wheel is also correct.

It is a further object of the present invention to provide a toe angle detecting apparatus comprising: wheel supporting means for supporting thereon each wheel of a vehicle, toe angle detecting means having a pair of detectors brought into contact with predetermined portions of one of the wheels, which portions are spaced a predetermined distance from each other, the toe angle detecting means being rotatably supported on a support shaft, and an angle detector for detecting an angle at which the toe angle detecting means is rotated about the support shaft.

It is a still further object of the present invention to provide the toe angle detecting apparatus wherein the wheel supporting means is supported by a first table movable in the direction of the length of the wheel and a second table movable in the direction of the width of the wheel.

It is a still further object of the present invention to provide the toe angle detecting apparatus wherein the wheel supporting means has a pair of support rollers for supporting the wheel, and the support rollers are disposed in such a manner that they are displaceably rotated about the support shaft.

It is a still further object of the present invention to provide the toe angle detecting apparatus wherein the wheel supporting means includes two pairs of wheel holding mechanisms which are brought into contact with both sides of the wheel so as to hold the wheel.

It is a still further object of the present invention to provide the toe angle detecting apparatus wherein the wheel holding mechanisms are coupled to each other by a pantagraph mechanism, and approach each other and move away from each other about the support shaft as a symmetric shaft.

It is a still further object of the present invention to provide the toe angle detecting apparatus wherein the wheel holding mechanisms each include a pair of holding rollers brought into contact with the predetermined portions of the wheel which are spaced a predetermined distance from each other, the wheel holding mechanisms being rotatably supported on the support shaft.

It is a still further object of the present invention to provide the toe angle detecting apparatus wherein the wheel holding mechanisms include at least one brake mechanism for preventing the mechanisms from being rotated about the support shaft.

It is a still further object of the present invention to provide the toe angle detecting apparatus wherein the wheel holding mechanisms each include position adjusting mechanisms for adjusting the vertical position of the pair of holding rollers with respect to the direction of the height of the wheel.

It is a still further object of the present invention to provide the toe angle detecting apparatus wherein the toe angle detecting means includes displacing means for causing the pair of detectors to move toward and away from the predetermined portions of the wheel.

It is a still further object of the present invention to provide the toe angle detecting apparatus wherein the toe angle detecting means has the pair of detectors which are brought into contact with a rim flange of the wheel.

It is a still further object of the present invention to provide the toe angle detecting apparatus wherein the toe angle detecting means has a position adjusting mechanism for adjusting the vertical position of the pair of detectors with respect to the direction of the height of the wheel.

It is a still further object of the present invention to provide the toe angle detecting apparatus wherein the angle detector comprises a rotary encoder supported on the support shaft.

The above and other objects, features and advantages of the present invention will become apparent from the

DETAILED DESCRIPTION OF THE PREFERRED EMBODIMENTS

Figure 1:
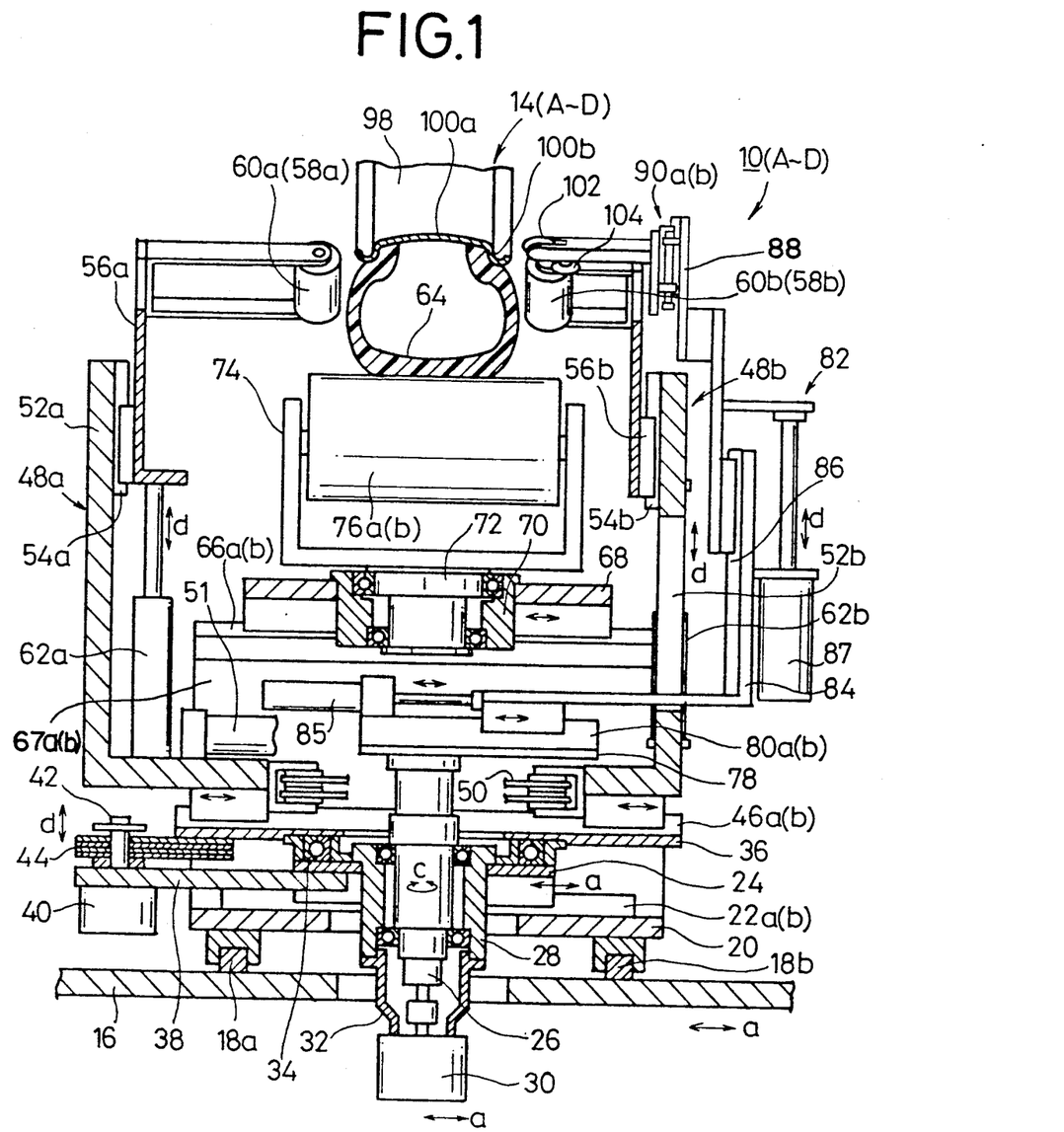
FIG. 1 is a front view partly in section showing a toe angle detecting apparatus according to one embodiment of the present invention.
Figure 2:
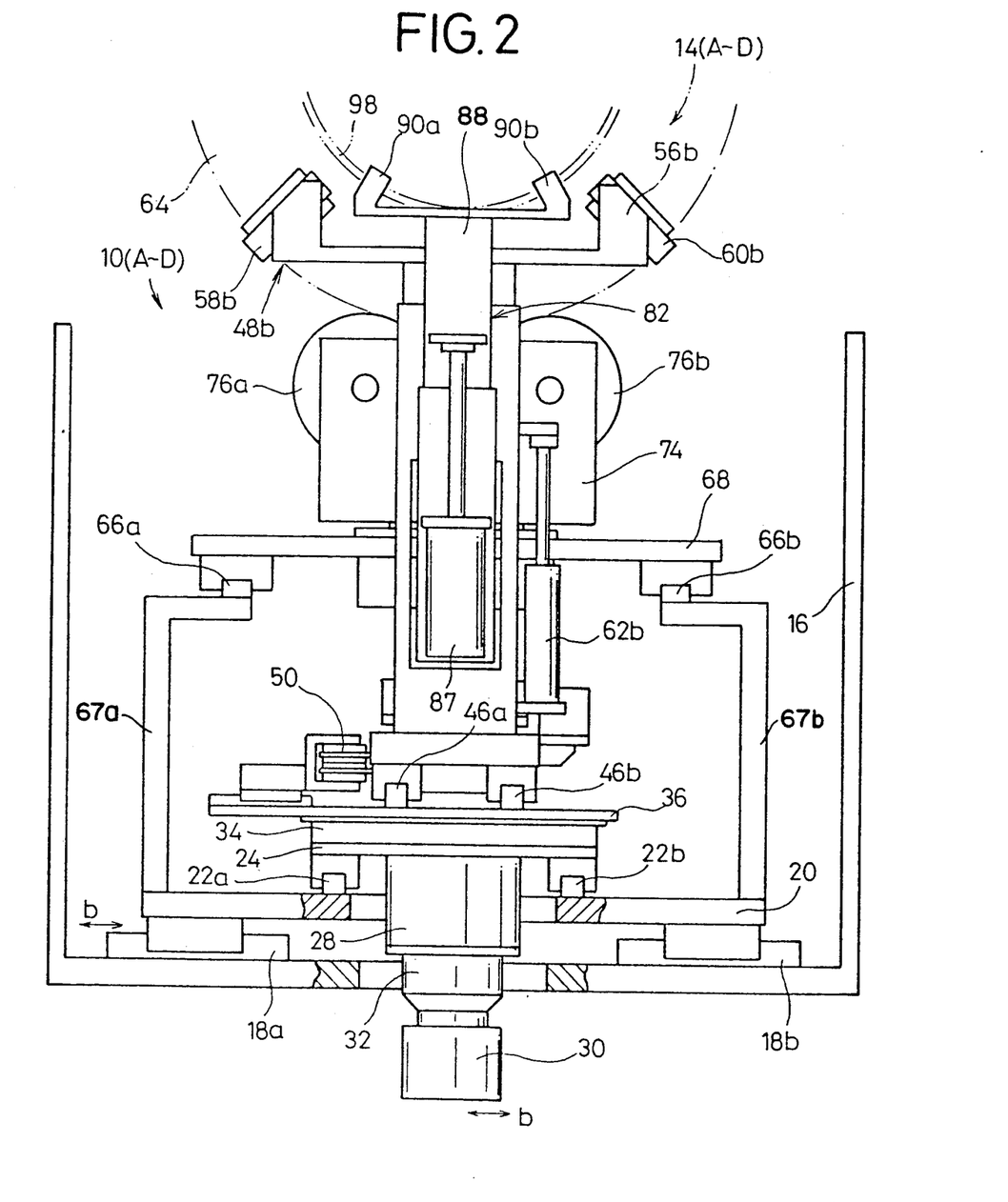
FIG. 2 is side view depicting the toe angle detecting apparatus shown in FIG. 1.
Figure 3:
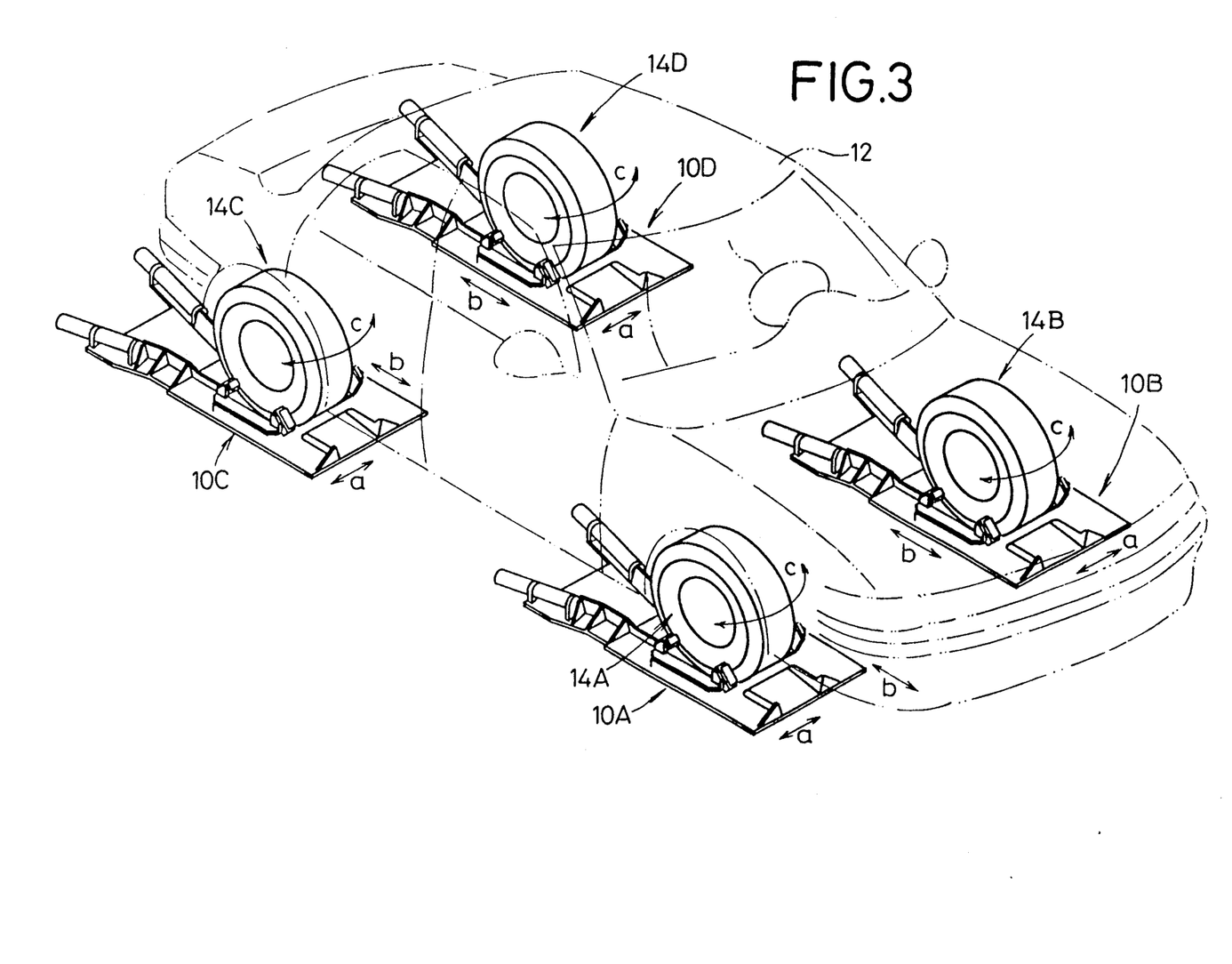
FIG. 3 is a perspective view showing the four toe angle detecting apparatuses according to the present invention, in relation to a vehicle positioned on them.
Figure 4:
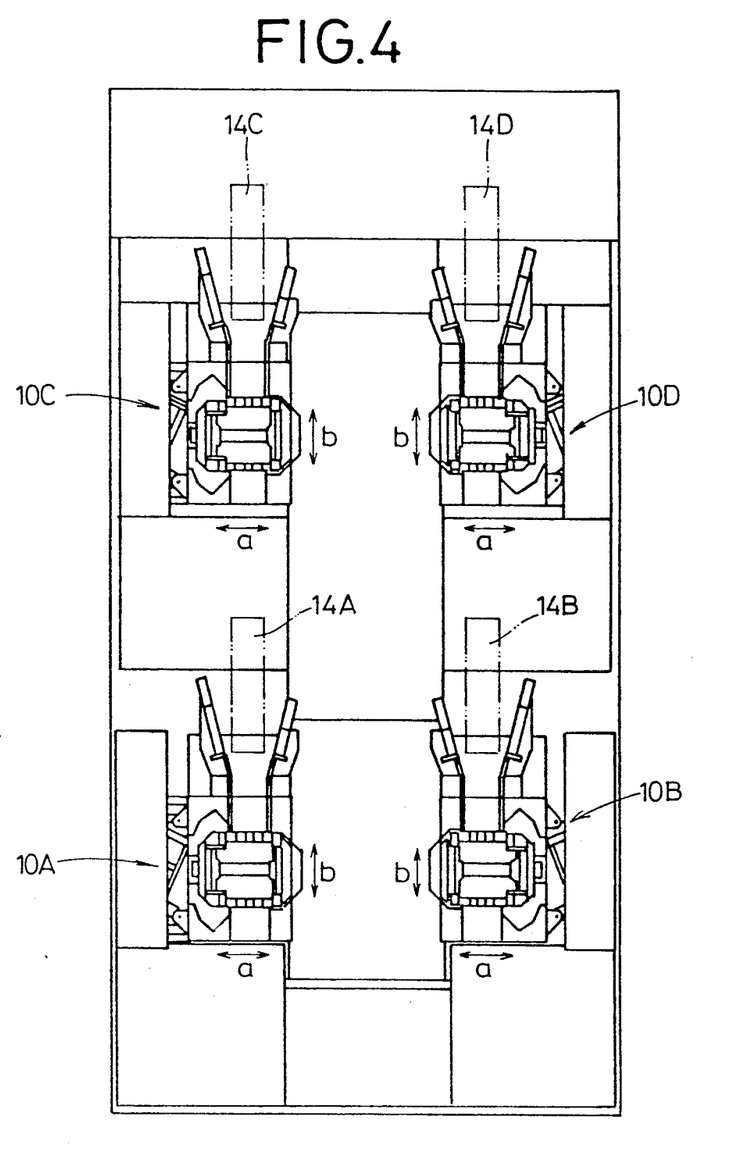
FIG. 4 is a plan view illustrating each of the toe angle detecting apparatuses shown in FIG. 3.

FIGS. 1 and 2 are respectively a front view partly in section and a side view showing a toe angle detecting apparatus according to one embodiment of the present invention. As shown in FIGS. 3 and 4, toe angle detecting apparatuses 10A through 10D are disposed in positions where they correspond to four vehicle wheels 14A through 14D mounted on a vehicle 12, respectively. The toe angle detecting apparatuses 10A through 10D are respectively movable in the directions indicated by the arrows a and b according to respective positions where the vehicle 12 is mounted thereon or to the width or length of the vehicle 12 (see Japanese Laid-Open Patent Publication No. 64-72001).

A detailed description will now be made of the structure of the toe angle detecting apparatus 10A with reference to FIGS. 1 and 2. Incidentally, other toe angle detecting apparatuses 10B through 10D are structurally identical to the toe angle detecting apparatus 10A and their description will therefore be omitted.

The toe angle detecting apparatus 10A is supported on a frame body 16 which can be moved in relation to the vehicle width (i.e., in the direction indicated by the arrow a) through unillustrated guide rails. A first table 20, which is movable in relation to the length of the vehicle 12 (i.e., in the direction indicated by the arrow b), is disposed on the frame body 16 through a pair of guide rails 18a, 18b. Incidentally, the frame body 16 and the first table 20 are positionally adjusted corresponding to the width and length of the vehicle 12 as an object to be measured.

A second table 24, which is movable in relation to the width of the vehicle 12 (i.e., in the direction indicated by the arrow a), is disposed on the first table 20 through guide rails 22a, 22b. Incidentally, the second table 24 is used to correct positional displacements of the vehicle 12 produced at the time that the vehicle 12 is moved to reach the toe angle detecting apparatus 10A. A support shaft 26 is supported through bearings 28 by the second table 24 so that it can be rotated in the direction indicated by the arrow c. A rotary encoder 30 (angle detector) for detecting the turning angle of the support shaft 26 is coupled to a lower end of the support shaft 26 through a bracket 32.

A third table 36, which is rotatable in the direction indicated by the arrow c, is disposed on the second table 24 through bearings 34. A brake cylinder 40 is mounted on the second table 24 through a bracket 38. A brake plate 44 attached to a cylinder rod 42 of the cylinder 40 is pressed against the third table 36, thereby preventing the rotation of the third table 36 with respect to the second table 24.

A pair of opposed wheel clamping means 48a, 48b are disposed on the third table 36 through guide rails 46a, 46b. The wheel clamping means 48a, 48b are coupled to each other by means of a pantagraph mechanism 50. A driving cylinder 51 is actuated to cause the wheel clamping means 48a, 48b to normally move toward and away from the wheel while always being symmetrical about the support shaft 26. The wheel clamping means 48a comprises a support member 52a shaped substantially in the form of an L, a bracket 56a movable in the direction indicated by the arrow d along a guide rail 54a, which is mounted on a side wall of the support member 52a extending in the vertical direction thereof, two clamping rollers 58a, 60a mounted on the bracket 56a, and an up-and-down movable cylinder 62a for moving the bracket 56a in upward and downward directions. As shown in FIG. 2, the clamping rollers 58a and 60a are disposed in such a manner that they are brought into contact with a side wall of a tire 64 of the wheel 14A. Incidentally, since the wheel clamping means 48b is structurally identical to the wheel clamping means 48a, the components associated with the wheel clamping means 48b are denoted by like reference numerals with a suffix b, and its description will be omitted.

A wheel support table 68 is displaced on the third table 36 through guide rails 66a, 66b in such a manner that it can be displaced in the direction indicated by the arrow. The guide rails 66a, 66b are supported on the first table 20 by support arms 67a, 67b. A support shaft 72 is supported by the wheel support table 68 through bearings 70 in such a way that it is rotatable in the direction indicated by the arrow c. Wheel support rollers 76a, 76b are supported on the support shaft 72 through a bracket 74.

On the other hand, a fourth table 78 is movably placed on an upper end of the support shaft 26, and a toe angle detecting means 82 is disposed on the fourth table 78 through guide rails 80a, 80b. The toe angle detecting means 82 comprises a support member 84 shaped substantially in the form of an L, a driving cylinder 85 (displacing means) for displacing the support member 84 in the direction indicated by the arrow along the guide rails 80a, 80b, a bracket 88 movable in the direction indicated by the arrow d by an up-down movable cylinder 87 along a guide rail 86 which is mounted on a side wall of the support member 84 extending in the vertical direction thereof, and two pairs of contact shoes 90a and 90b mounted on the bracket 88.

Figure 5:
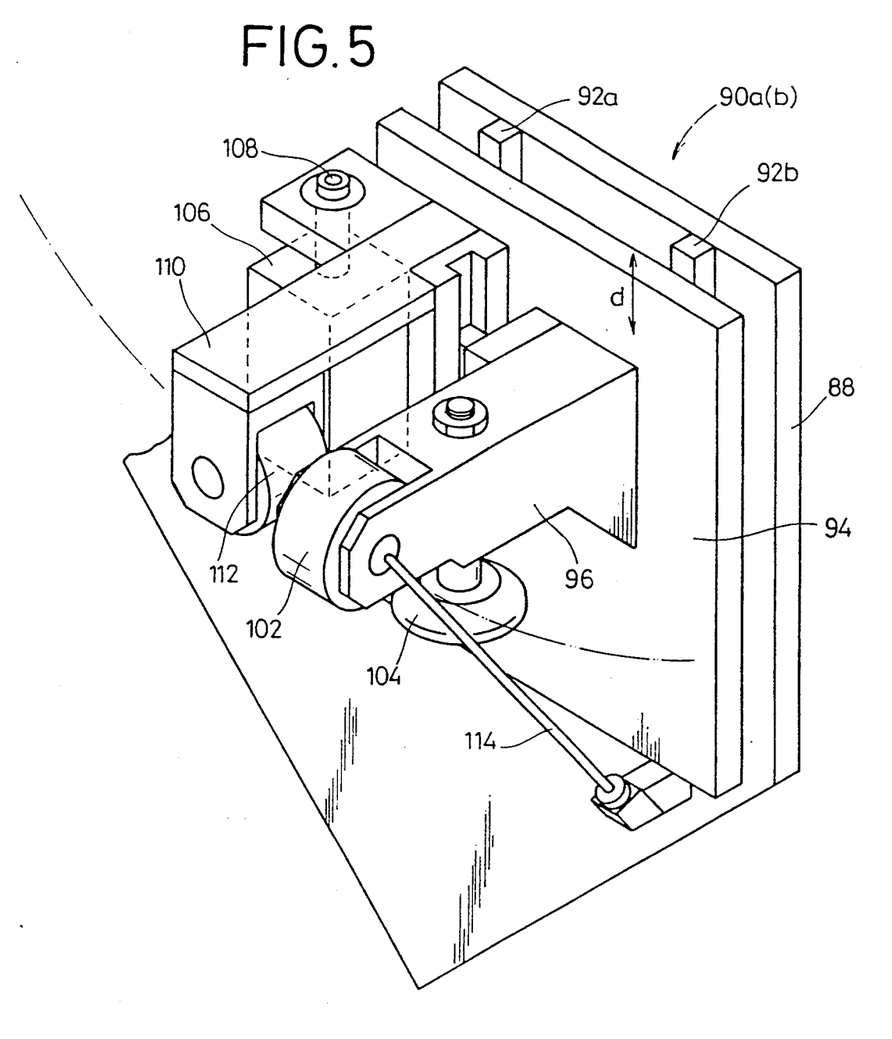
FIG. 5 is a perspective view showing a detector employed in each of the toe angle detecting apparatuses according to the present invention.
Figure 6:
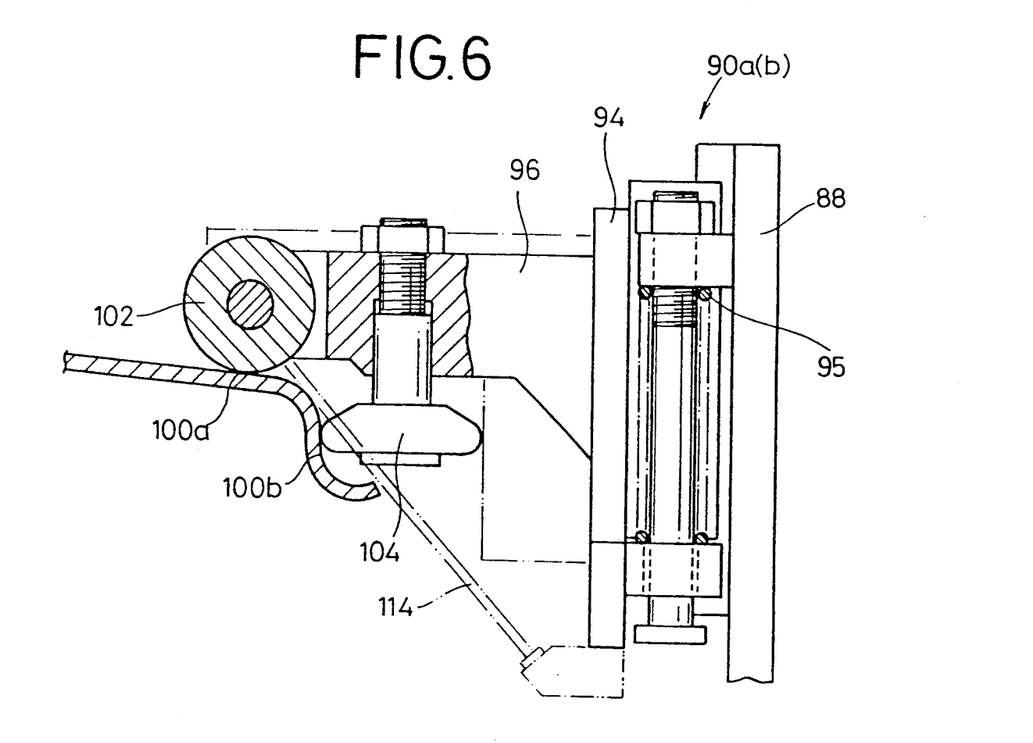
FIG. 6 is a side view partly in section showing the detector depicted in FIG. 5.

The contact shoe 90a is constructed as shown in FIGS. 5 and 6. More specifically, the contact 90a has a fifth table 94 mounted through guide rails 92a, 92b on the bracket 88 so that it can be displaced in the direction indicated by the arrow d. Mounted on the fifth table 94 through a bracket 96 are a first roller 102 brought into contact with an upper surface 100a of a rim 98 in the wheel 14A and a second roller 104 brought into contact with a rim flange 100b of the rim 98. In addition, the fifth table 94 has a cylinder 106 mounted thereon. A third roller 112 is mounted through a bracket 110 on a cylinder rod 108 of the cylinder 106. The third roller 112 can be displaced in the direction indicated by the arrow d by means of the cylinder 106. The first to third rollers 102, 104 and 112 have support shafts crossed at right angles to one another respectively. The first roller 102 is disposed so as to provide movement from the rim flange 100b to the upper surface 100a of the rim 98, whereas the second roller 104 is disposed so as to roll along the rim flange 100b. In addition, the third roller 112 is disposed so as to roll along the upper surface 100a of the rim 98. The fifth table 94 has an antenna 114 for detecting a balance weight with a convex portion formed in the rim flange 100b. A sensor such as a pressure sensor is connected to the antenna 114. When the sensor detects that the antenna 114 is brought into contact with the balance weight, the position of the balance weight can be confirmed by the sensor.

The toe angle detecting apparatuses 10A through 10D according to the present embodiment are constructed as described above. Operations of the toe angle detecting apparatuses 10A through 10D will now be described.

First of all, the toe angle detecting apparatuses 10A through 10D are respectively displaced in the directions indicated by the arrows a and b corresponding to the width and length of the vehicle 12 as the object to be measured. More specifically, the frame body 16 is displaced a predetermined amount in the direction indicated by the arrow a in order to adjust each width of the respective toe angle detecting apparatuses 10A through 10 with respect to the width of the vehicle 12. Then, the first table 20 is displaced a predetermined amount in the direction indicated by the arrow b in order to adjust the length of each of the toe angle detecting apparatuses 10A through 10D with respect to the length of the vehicle 12.

The wheel clamping means 48a, 48b and the toe angle detecting means 82 are mounted on the first table 20, and displaced integrally with the wheel support rollers 76a, 76b in the direction of the length of the vehicle 12. Thus, the positional relation between the wheel clamping means 48a, 48b and the toe angle detecting means 82 are held constant at all times in spite of any positional displacement of the first table 20 in the direction of the length of the vehicle 12 (see FIG. 2).

Then, the vehicle 12 is caused to approach each of the toe angle detecting apparatuses 10A through 10D, and the wheels 14A through 14D are respectively placed on the wheel support rollers 76a, 76b of each of the toe angle detecting apparatuses 10A through 10D (see FIGS. 1 through 3). In this case, the toe angle detecting apparatuses 10A through 10D are respectively displaced through the second table 24 in the direction indicated by the arrow a in correspondence to displacements in positions where the vehicle 12 approaches the toe angle detecting apparatuses 10A through 10D. In addition, the wheel support rollers 76a, 76b turn completely about in direction by the support shaft 72 in response to the direction of rotation of each of the wheels 14A through 14D, thereby completing the positioning of each of the wheels 14A through 14D.

Then, the driving cylinder 51 is actuated to cause the wheel clamping means 48a, 48b to approach relative to each other along the guide rails 46a, 46b, respectively. The clamping rollers 58a, 60a, and 58b, 60b are brought into contact with the side wall of the tire 64 as shown in FIGS. 2 and 3. Incidentally, the clamping rollers 58a, 60a and 58b, 60b are pre-adjusted for their vertical positions by means of the up-and-down movable cylinders 62a and 62b, respectively. The wheel clamping means 48a, 48b are rotated about the support shaft 26 through the bearings 34 in such a way that the clamping rollers 58a, 60a and 58b, 60b are scanned along the side wall of the tire 64. Then, the cylinder 40 is actuated to press the brake plate 44 against the third table 36 so as to couple the second table 24 to the third table 36, thereby fixing the wheel clamping means 48a and 48b.

Then, the vertical position of each of the contact shoes 90a, 90b adjusted by means of the up-and-down movable cylinder 87. Thereafter, the driving cylinder 85 is actuated to displace the toe angle detecting means 82 toward the wheel 14A along the guide rails 80a, 80b. In this case, the cylinder 106 is actuated to displace the third roller 112 downwardly. Then, the third roller 112 is brought into contact with the upper surface 100a of the rim 98. The antenna 114 of each of the contact shoes 90a, 90b is brought into contact with the rim 98 of the wheel 14A. The wheel 14A is rotated until the antenna 114 detects the balance weight attached to the rim 98. When the antenna 14 detects the balance weight, the wheel 14A is further rotated through a predetermined amount. Thus, when the first roller 102 and the second roller 104 are brought into contact with the rim 98, the second roller 104 can be prevented from interfering with the balance weight.

Then, the cylinder 106 is re-actuated to move the third roller 112 away from the upper surface 100a of the rim 98, and to bring the first roller 102 and the second roller 104 into contact with the upper surface 100a of the rim 98 and the rim flange 100b respectively (see FIG. 6). Since the fifth table 94 can be displaced by means of a spring 95 in the direction indicated by the arrow d along the bracket 88, each of the first roller 102 and the second roller 104 is accurately positioned in a predetermined position of the rim 98.

When the contact shoes 90a, 90b of the toe angle detecting means 82 are first brought into contact with the rim 98, the toe angle detecting means 82 is rotated about the support shaft 26 in such a manner that the respective contact shoes 90a, 90b are scanned along the rim 98. The rotary encoder 30 is coupled to the support shaft 26 and detects the turning angle of the toe angle detecting means 82, i.e., a toe angle as an angle at which the wheel 14A is turned, i.e., deflected from the direction in which the wheel 14A travels forward.

When the toe angle detecting apparatus 10A is displaced in the direction of the length of the vehicle 12 (i.e., in the direction indicated by the arrow b) to suit the length of the vehicle 12, as described above, the toe angle detecting means 82 is displaced integrally with the wheel support rollers 76a, 76b as the first table 20 is displaced. Thus, the toe angle detecting means 82 is accurately brought into contact with a predetermined portion of the rim flange 100b in the wheel 14A at all times. As a result, the toe angle detecting means 82 can give accurately information about the toe angle as the deflection angle of the wheel 14A to the rotary encoder 30. The toe angle is detected on the basis of the rim 98 having predetermined accuracy without using, as a reference, the tire 64 which varies in shape. As a consequence, the toe angle can be detected with extremely high accuracy.

According to the present invention, as has been described above, when it is desired to adjust the position of the toe angle detecting apparatus with respect to the direction of the length of the vehicle, the toe angle detecting means is also displaced together with the wheel supporting means for supporting each of the wheels through each table in the direction of the length of the vehicle. Therefore, the toe angle detecting means can be held in position at all times with respect to each of the wheels. Thus, the toe angle detecting means is brought into contact with the desired portion of each of the wheels regardless of the positional displacements of the wheel supporting means. The detectors of the toe angle detecting means are brought into contact with the two portions of the rim flange of each wheel, which portions are spaced a predetermined distance from each other. In addition, the angle detector detects the turning angle of the toe angle detecting means by scanning each of the wheels with the detectors. In this case, the dimensions of the rim flange are kept constant regardless of the size of each wheel. Thus, the toe angle can be detected with extremely high accuracy.

Having now fully described the invention, it will be apparent to those skilled in the art that many changes and modifications can be made without departing from the spirit or scope of the invention as set forth herein.

What is claimed is:

1. A toe angle detecting apparatus comprising:
   wheel supporting means for supporting thereon each wheel attached to a vehicle, said wheel supporting means being rotatably mounted on a vertical support shaft;
   toe angle detecting means rotatably mounted on said support shaft and provided with a pair of contact shoes spaced horizontally at a predetermined distance from each other, said toe angle detecting means being rotatable independently of said wheel supporting means, said contact shoes being displaceable vertically and displaceable radially with respect to said support shaft, and brought into contact with said wheel at predetermined portions thereof to rotate said toe angle detecting means about said support shaft toward a toe direction of said wheel; and
   an angle detector for detecting an angle at which said toe angle detecting means is rotated about said support shaft.

2. A toe angle detecting apparatus according to claim 1, wherein said wheel supporting means is supported by a first table movable in the direction of the length of said wheel and a second table movable in the direction of the width of said wheel.

3. A toe angle detecting apparatus according to claim 1, wherein said wheel supporting means has a pair of support rollers for supporting said wheel, and said support rollers are disposed in such a manner that they are displaceably rotated about said support shaft.

4. A toe angle detecting apparatus according to claim 1, wherein said wheel supporting means includes two pairs of wheel holding mechanisms which are brought into contact with both sides of said wheel so as to hold said wheel.

5. A toe angle detecting apparatus according to claim 4, wherein said wheel holding mechanisms are coupled to each other by a pantagraph mechanism, and approach each other and move away from each other about said support shaft as a symmetric shaft.

6. A toe angle detecting apparatus according to claim 4, wherein said wheel holding mechanism each include a pair of holding rollers brought into contact with said predetermined portions of said wheel which are spaced the predetermined distance from each other, said wheel holding mechanisms being rotatably supported on said support shaft.

7. A toe angle detecting apparatus according to claim 6, wherein said wheel holding mechanisms include at least one brake mechanism for preventing said mechanisms from being rotated about said support shaft.

8. A toe angle detecting apparatus according to claim 6, wherein said wheel holding mechanisms each include position adjusting mechanisms for adjusting the vertical position of said pair of holding rollers with respect to the direction of the height of said wheel.

9. A toe angle detecting apparatus according to claim 1, wherein said toe angle detecting means includes displacing means for causing said pair of contact shoes to move toward and away from said predetermined portions of said wheel.

10. A toe angle detecting apparatus according to claim 1, wherein said toe angle detecting means has said pair of contact shoes which are brought into contact with a rim flange of said wheel.

11. A toe angle detecting apparatus according to claim 1, wherein said toe angle detecting means has a position adjusting mechanism for adjusting the vertical position of said pair of contact shoes with respect to the direction of the height of said wheel.

12. A toe angle detecting apparatus according to claim 1, wherein said angle detector comprises a rotary encoder supported on said support shaft.

* * * * *